United States Patent
Fujiwara

(10) Patent No.: US 7,218,423 B2
(45) Date of Patent: May 15, 2007

(54) FACSIMILE APPARATUS FOR INCORPORATING OWN FACSIMILE NUMBER INTO TRANSMITTER TERMINAL INFORMATION

(75) Inventor: Yasushi Fujiwara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 925 days.

(21) Appl. No.: 10/213,579

(22) Filed: Aug. 7, 2002

(65) Prior Publication Data

US 2003/0048486 A1 Mar. 13, 2003

(30) Foreign Application Priority Data

Aug. 9, 2001 (JP) .............................. 2001-242209
Jul. 31, 2002 (JP) .............................. 2002-223778

(51) Int. Cl.
H04N 1/00 (2006.01)
H04N 1/32 (2006.01)

(52) U.S. Cl. .................... 358/434; 358/408; 358/442; 358/468

(58) Field of Classification Search ................ 358/434, 358/408, 442, 468; 379/100.12
See application file for complete search history.

(56) References Cited

U.S. PATENT DOCUMENTS 5,021,889 A * 6/1991 Yamamoto .................. 358/440
5,896,203 A * 4/1999 Shibata ....................... 358/404
6,310,699 B1 * 10/2001 Kawasaki .................... 358/434

FOREIGN PATENT DOCUMENTS

JP 0414468 * 5/1992
JP 6-14176 1/1994

* cited by examiner

Primary Examiner—Edward Coles
Assistant Examiner—Houshang Safaipour
(74) Attorney, Agent, or Firm—Cooper & Dunham LLP

(57) ABSTRACT

A facsimile apparatus can automatically register its own facsimile number into TTI, the own facsimile number being previously registered in the facsimile apparatus. In the facsimile apparatus, information containing the own facsimile number is input to the facsimile apparatus. The input own facsimile number is automatically incorporated into transmitter terminal identification (TTI) information as information regarding a transmitting end.

12 Claims, 12 Drawing Sheets

FIG.2

| | | OWN FAX NO. | CSI | G4TID | SUBSCRIBER NUMBER |
|---|---|---|---|---|---|
| PSTN | | ○ | ○ | × | × |
| ISDN | G3 | ○ | ○ | × | ○ |
| | G4 | ○ | × | ○ | ○ |

FACSIMILE APPARATUS FOR INCORPORATING OWN FACSIMILE NUMBER INTO TRANSMITTER TERMINAL INFORMATION

BACKGROUND OF THE INVENTION

1. Field of the Invention

The present invention generally relates to facsimile apparatuses and, more particularly, to a facsimile apparatus provided with a transmitter terminal information (TTI) registration function so as to satisfy conditions for approval regarding facsimile communication.

2. Description of the Related Art

Generally, facsimile apparatuses are provided with various functions such as a transmitter terminal identification (TTI) function, a receiver terminal identification (RTI) function or a function to output a management report such as a report of date and results of facsimile transmission. The TTI function is to send identification information (information printed at the time of print at a receiving end) such as a name, a telephone number, etc. of a transmitting end to a receiving end. The RTI function is to notify a transmitting end of a name, a telephone number, etc. of a receiving end. With development of a communication network in recent years, facsimile communication with foreign countries by facsimile apparatuses having the above-mentioned functions has been daily performed. Original approval conditions regarding facsimile communication are enacted in each country. For example, in the United States of America, it is mandatory to include transmitter's own facsimile number in TTI.

The operation to set up own facsimile number in advance at the time of the TTI registration is performed by a user. Thus, if a user dose not set up own facsimile number, it may be unable to perform normal facsimile communication. Additionally, it is troublesome work for a user to make a setting change so as to correspond to the approval conditions of each country.

Further, a facsimile apparatus, which is not provided with a relay request transmitting function, may not have a registration function to set up own facsimile number. The relay request transmission is an operation to transmit facsimile data to a plurality of facsimile apparatuses in a remote location via a facsimile apparatus for relay, which is located close to the location of the remote facsimile apparatuses. The facsimile data is first sent to the relay facsimile apparatus, and, then, distributed to the plurality of remote facsimile apparatuses from the relay facsimile apparatus. In the relay request transmission, it is necessary to send a report from the relay facsimile apparatus to the facsimile apparatus that requested the relay facsimile transmission, the report indicating that the facsimile data has been sent from the relay facsimile apparatus. For this reason, the facsimile apparatus, which requests transmission, needs to notify the relay facsimile apparatus of its own facsimile number. Thus, the requesting facsimile apparatus must have a registration function to register its own facsimile number. However, it is not necessary for a facsimile apparatus, which does not have the relay request transmission function, to send its own facsimile number, and there is a case in which a facsimile apparatus does not have a registration function to register its own facsimile number.

Moreover, a facsimile apparatus exclusive for the integrated service digital network (ISDN) or a G4 facsimile apparatus is not provided with a registration function to register CSI (international identification number, called terminal discernment) registration function. Therefore, in the case of such a facsimile apparatus, the TTI registration cannot be performed.

SUMMARY OF THE INVENTION

It is a general object of the present invention to provide an improved and useful facsimile apparatus in which the above-mentioned problems are eliminated.

A more specific object of the present invention is to provide a facsimile apparatus which can automatically register its own facsimile number into TTI, the own facsimile number being previously registered in the facsimile apparatus.

In order to achieve the above mentioned objects, there is provided according to the present invention a facsimile apparatus comprising: input means for inputting information containing an own facsimile number; and means for automatically incorporating the input own facsimile number into transmitter terminal identification (TTI) information as information regarding a transmitting end.

According to the present invention, it is not required for a user to perform independently an operation of setting the own facsimile number in TTI since the own facsimile number is automatically incorporated into TTI. Additionally, a case where the own facsimile number is not set in TTI is prevented from occurring.

The facsimile apparatus according to the present invention may further comprise memory means for storing information containing the input own facsimile number. Accordingly, there is no need to input the own facsimile number only for setting TTI since the own facsimile number stored in the memory can be read and incorporated.

Additionally, the facsimile apparatus according to the present invention may further comprises: data transmission and reception means for transmitting image data to and receiving image data from a remote facsimile apparatus through a communication line; and information adding means for adding the information regarding a transmitting end to the image data when the data transmission and reception means transmits the image data to the remote facsimile apparatus.

According to the above-mentioned invention, the image data transmitted to a remote facsimile apparatus is always provided with the facsimile number of the transmitting facsimile apparatus.

Further, the facsimile apparatus according to the present invention may further comprise: input request means for requesting an input of information containing the own facsimile number to be added to the image data by the information adding means; determination means for determining whether to register the information stored in the memory means by combining with the TTI information; and TTI registration means for registering as TTI the information obtained by combining the information containing the own facsimile number with the TTI information, wherein the TTI registration means registers the TTI by combining the information containing the own facsimile number with the TTI information only when the information stored in the memory means is determined to contain a numerical character.

According to the above-mentioned invention, the user is requested to input information containing numeric characters which is regarded as the own facsimile number, and the TTI registration is completed only when the information input by the user contains numeric characters. Thus, there is no case where the own facsimile number is not set in TTI.

Additionally, in the present invention, the information containing the own facsimile number nay be one of own facsimile number information consisting of the own facsimile number, called subscriber identification (CSI) information, G4 terminal identification (G4TID) information and subscriber number information. That is, if one of the own facsimile information, the CSI information, the G4TID information and the subscriber number information is input to the facsimile apparatus, the own facsimile number is incorporated into ITT.

In the present invention, the TTI registration means may incorporate the own facsimile number information stored in the memory means into the TTI. Thus, the own facsimile number can be automatically incorporated into the TTI by reading from the memory means. Additionally, the TTI registration means may incorporate the CSI information stored in the memory means into the TTI. Since the CSI information contains the own facsimile number, the own facsimile number can be automatically incorporated into the TTI by reading from the memory means. Further, the TTI registration means incorporates the G4TID information stored in the memory means into the TTI. Since the G4TID information contains the own facsimile number, the own facsimile number can be automatically incorporated into the TTI by reading from the memory means. Furthermore, the TTI registration means may incorporate the subscriber number information stored in the memory means into the TTI. Since the subscriber number information contains the own facsimile number, the own facsimile number can be automatically incorporated into the TTI by reading from the memory means.

Other objects, features and advantages of the present invention will become more apparent from the following detailed description when read in conjunction with the accompanying drawings.

BRIEF DESCRIPTION OF THE DRAWINGS

FIG. 2 is an illustration showing each kind of information usable as information containing own facsimile number to be registered;

DETAILED DESCRIPTION OF THE PREFERRED EMBODIMENT

A detailed description will now be given, with reference to FIGS. 1 through 12, of a preferred embodiment of the present invention.

Figure 1:
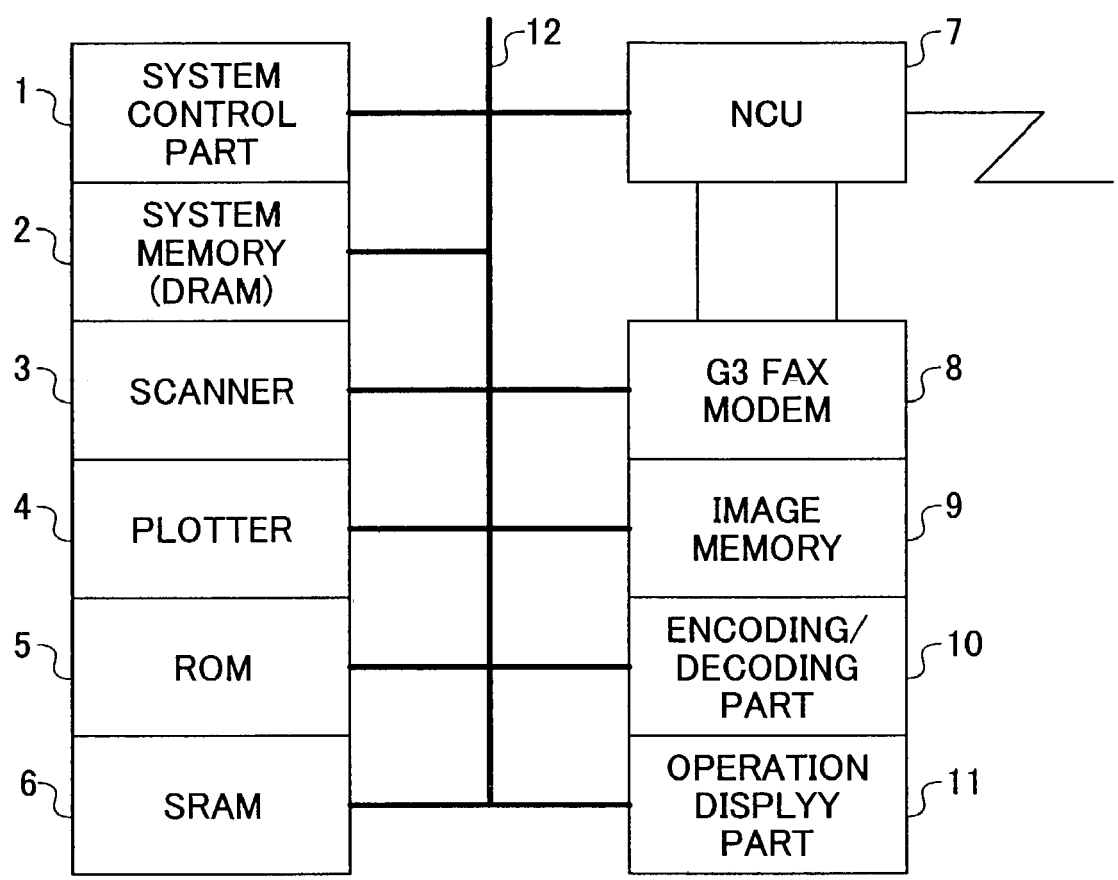
FIG. 1 is a block diagram showing an outline structure of a facsimile apparatus according to an embodiment of the present invention.

FIG. 1 is a block diagram showing an outline structure of a facsimile apparatus according to the embodiment of the present invention. The facsimile apparatus shown in FIG. 1 is provided with a system control part 1. Connected to the system control part 1 through the bus line 12 are a system memory (DRAM) 2, a scanner (SCN) 3, a plotter 4, a read only memory (ROM) 5, a non-volatile random access memory (SRAM) 6, a network control unit (NCU) 7, a G3 FAX modem 8, an image memory (SAF) 9, an encoding/decoding part (DCR) 10, and an operation display part 11.

The system control part 1 controls operations of each part 2–11 and performs a facsimile transmission control procedure. The system memory 2 stores data required when the system control part 1 executes a control program, and is used as a work area.

The plotter 4 performs image formation of an original image read by the scanner 3 in predetermined resolution, and prints out the formed image or list reports. The read only memory 5 stores programs and various tables. The non-volatile read only memory 6 stores parameters needed for the system control and registration data obtained by user operation. The network control unit 7 serves as a connecting part which connects the facsimile apparatus to a public service telephone network. The network control unit 7 has an automatic transmission function so as to exchange image data with other facsimile apparatuses connected through the public service telephone network.

G3 FAX modem 8 provides a modem function of group 3 facsimile (a facsimile for analog telephone lines compliant with G3 specification). The image memory 9 stores a transmitting image and a receiving image, if needed. The encoding/decoding part 10 compresses a raw image (corresponding to the original image read by the scanner 3), or decompresses the encoded image to the original raw image. The operation display part 11 is used for a communication operation or a registration operation, and constituted by various input keys and displays.

Next, a description will be given of an own facsimile number registration, CSI, G4TID and a subscriber number, which are usable as information containing own facsimile number.

FIG. 2 is an illustration showing each kind of information usable as the information containing own facsimile number to be registered.

As shown in FIG. 2, when PSTN (public service telephone network) is used, an own facsimile number and CSI can be an object for registration of own facsimile number. On the other hand, in the case of G3 facsimile of ISDN (Integrated Service Digital Network), an own facsimile number, called subscriber identification (CSI), and a subscriber number can be an object for registration of own facsimile number. In the case of G4 facsimile (the facsimile for digital lines compliant with G4 specification) of ISDN, an own facsimile number, G4TID, and a subscriber number can be the object of registration of own facsimile number. In the registration of own facsimile number, for example, a number consisting of 001 (international prefix) 81 (country number) 3 (long-distance number excluding 0)—(pause) 12345678 (local number) is registered. A model which does not have a relay request transmission function is not provided with a function to register own facsimile number since the own facsimile number is not needed.

In the case where CSI is used, a number consisting of 81 (country number) 3 (long-distance number excluding 0) 12345678 (local number) is registered. In the case of G4TID, 81 (country number)—312345678 (long-distance number+local number excluding 0)=AOYAMA (terminal cable address) is registered.

In the case where the subscriber number is used, a number consisting of 03 (long-distance number)—(pause) 12345678 (member number) is registered.

Figure 3:
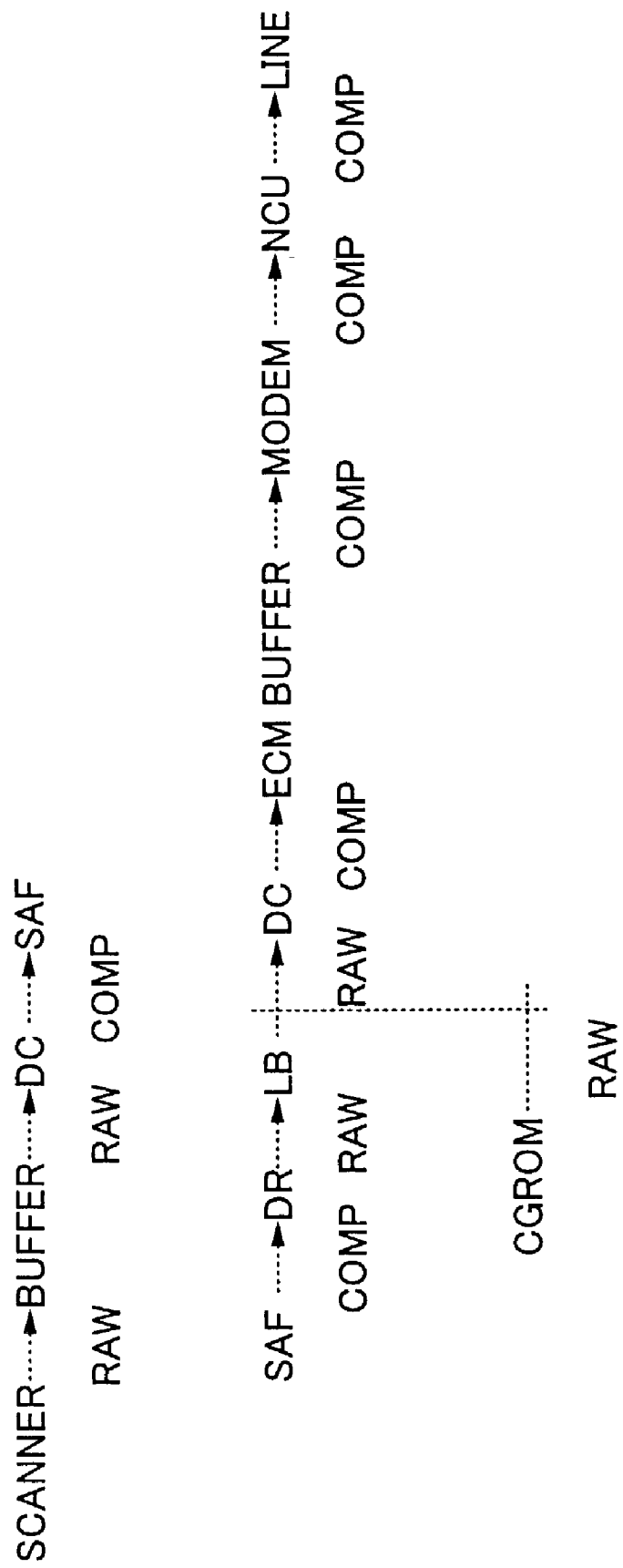
FIG. 3 is an illustration showing image data flow during memory transmission.

A description will now be given of a memory transmission of image data. FIG. 3 is an illustration showing image data flow in the data bus during memory transmission. It should be noted that "raw" in the figure indicates raw image data, and "comp" indicates compressed image data.

First, the data flow at the time of memory transmission will be explained. Image data read by the scanner 3 is stored in the line buffer (LB) of the system memory 2. The raw image data is compressed by the encoding/decoding part 10 (DC), and is stored in the image memory 9 (SAF). If a calling time is reached in consideration of time specification etc., the image data to be transmitted is read from the image memory 9 (SAF), and the image data (image information) is decoded by the encoding/decoding part 10 (DR). Then, the decoded image data is stored in the line buffer (LB) on the system memory 2.

A font is read from a character generating device (CGROM) on the read only memory 5, and is synthesized with the raw image data stored in the line buffer on, the system memory 2. The synthesized image data is again compressed by the encoding/decoding part 10 (DC), and is sent to the ECM buffer in the system memory 2. The compressed image data is sent to the network control unit 7 (NCU) via the G3 FAX modem 8 (modem), and then is sent to the line.

Next, although illustration is omitted, the data flow at the time of direct transmission will be explained.

At the time of direct transmission, the raw image data obtained by scanning is temporarily stored in the image memory 9. However, the memory transmission procedure "reading the image data and encoding the read compressed image data by the encoding/decoding part 10 and store the decompressed image data in the line buffer on the system memory 2" is not performed. That is, at the time of direct transmission, the raw image data from the character generating device on the read only memory 5 is synthesized with the raw image data obtained by scanning without supplying the raw image data to the encoding/decoding part 10. Thus, at the time of direct transmission, a font is read from the character generating device on the read only memory 5 so as to be synthesized with the raw image data already stored in the line buffer on the system memory 2. The synthesized image information is again compressed by the encoding/decoding part 10, and is sent to the ECM buffer in the system memory 2. The compressed image data in the ECM buffer is sent to the network control unit 7 via the G3 FAX modem 8, and is sent to the line.

A description will now be given of a registration relating to the own facsimile number. The system control part 1 retrieves the input data (data input through the operation display part 11) from the operation display part 11 according to the program read from the read only memory 5. The system control part 1 displays information on an LCD of the facsimile apparatus so as to urge a user to make selection, input or guidance with respect to the displayed information, and writes the input data with respect to the displayed information in the non-volatile random access memory 6. As for the contents of information to be stored in the non-volatile random access memory 6, there are the own facsimile number, CSI, G4TID and subscriber number.

A description will be given below of procedures of the TTI registration, the own facsimile number registration, the CSI registration, the G4TID registration and the subscriber number registration.

Figure 4:
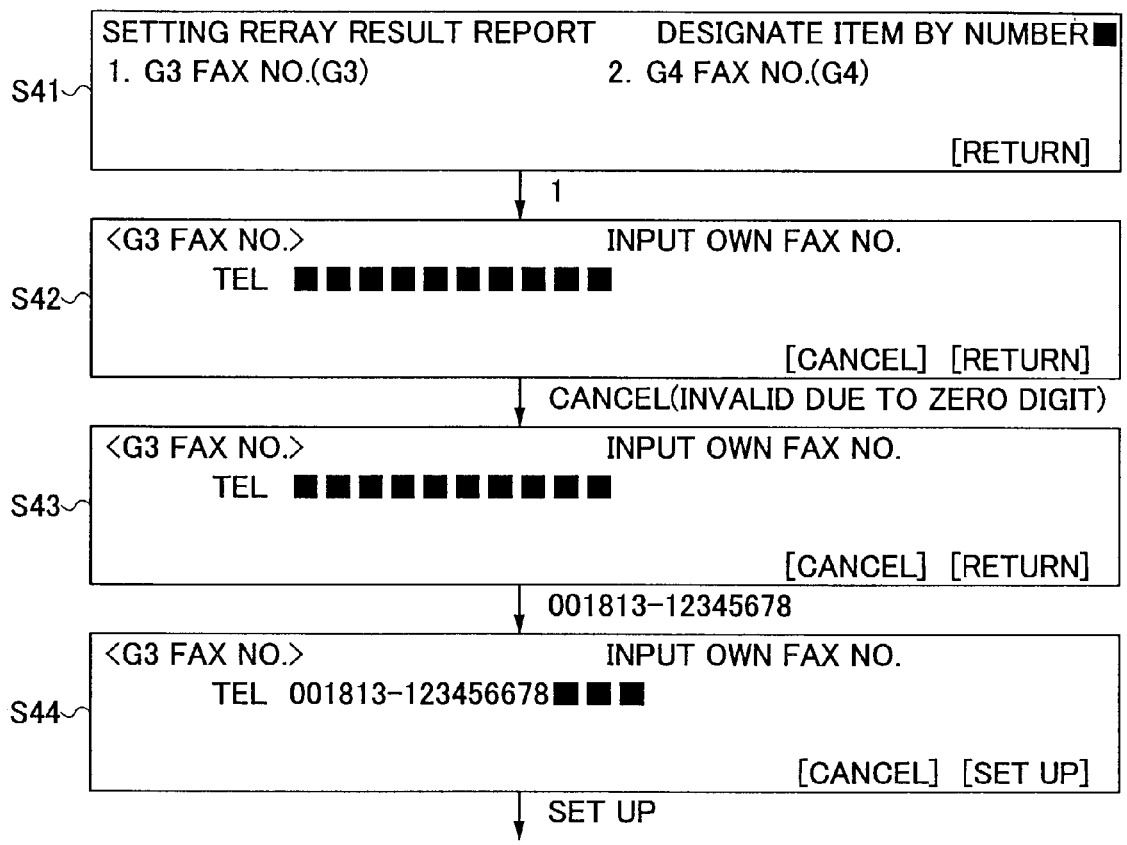
FIG. 4 is a flowchart of an own number registration.

FIG. 4 is a flowchart of the own number registration in which screens displayed on the operation display part 11 are sequentially indicated as steps of the registration operation. In the relay result report setting screen as an own facsimile number registration screen displayed by the system control part 1, if a user selects "1. G3 FAX NUMBER (G3)" (step 41), a G3 FAX number input screen, i.e., a screen to input the facsimile number of its own is displayed (step 42). Here, if the user selects "cancel", the own facsimile number cannot be registered since the input data is invalid due to 0 digit data (step 43). If the user inputs, for example, 001 (international prefix) 81 (country number) 3 (long-distance number excluding 0)—(pause) 12345678 (local number) as the own facsimile number and selects "SETUP", the own number registration is completed (step 44).

Figure 5:
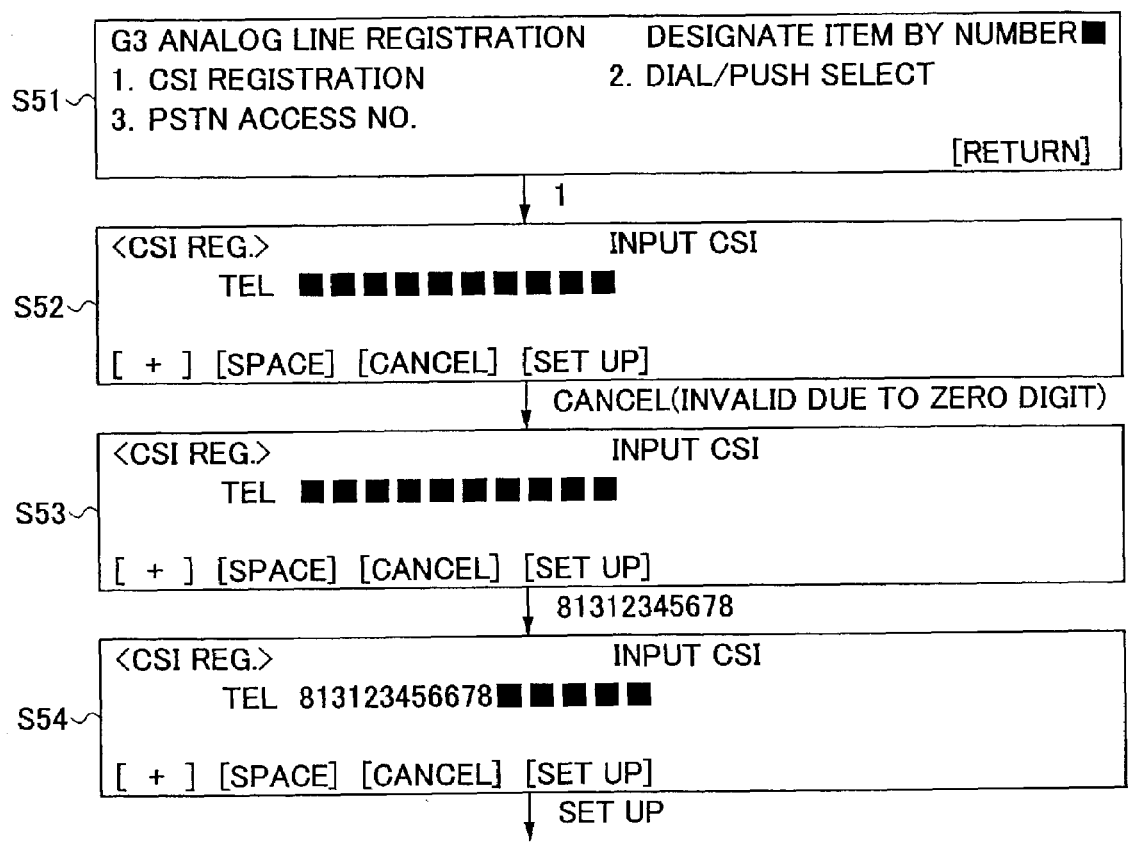
FIG. 5 is a flowchart of a CSI registration.

FIG. 5 is a flowchart of the CSI registration in which screens displayed on the operation display part 11 are sequentially indicated as steps of the registration operation. If a user selects "1. CSI REGISTRATION" (step 51) in a G3 analog line registration screen displayed by the system control part 1, a CSI registration screen is displayed (step 52). The CSI registration screen is for inputting the identification number of the facsimile apparatus. Here, if the user selects "CANCEL", the CSI registration cannot be carried out since the input data is invalid due to 0 digit data (step 53). If the user inputs, for example, 81 (country number) 3 (long-distance number excluding 0) 12345678 (local number) as the CSI registration number and selects "SETUP", the CSI registration is completed (step 54).

Figure 6:
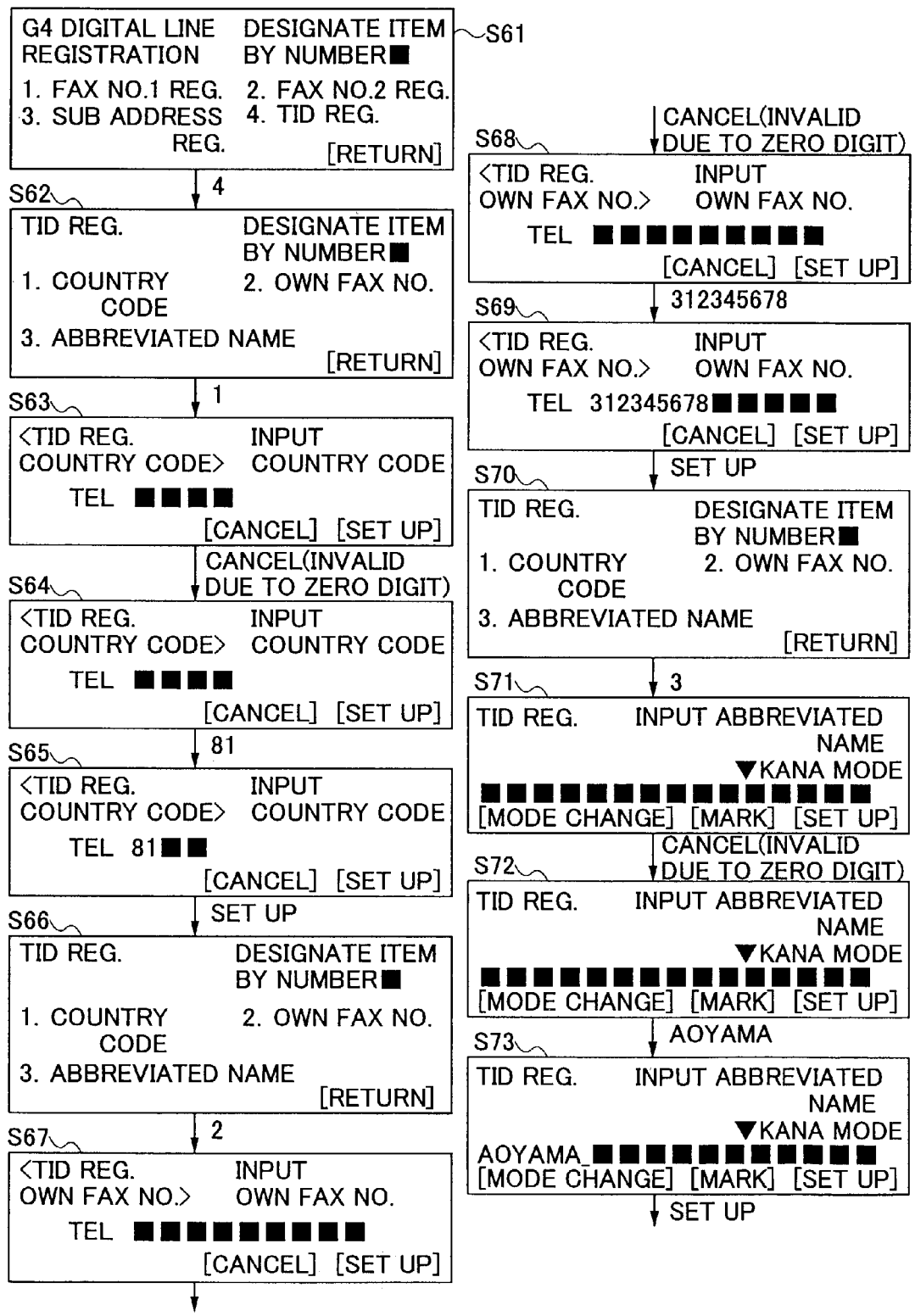
FIG. 6 is a flowchart of a G4TID registration.

FIG. 6 is a flowchart of the G4TID registration in which screens displayed on the operation display part 11 are sequentially indicated as steps of the registration operation. If a user selects "1. TID REGISTRATION" (step 61) in a G4 digital line registration screen displayed by the system control part 1, a TID registration screen is displayed (step 62). If the user selects "1. COUNTRY CODE" in the TID registration screen, a country code registration screen is displayed (step 63). If the user select "CANCEL" here, the country code as the TID registration cannot be registered since the input data is invalid due to 0 digit data (step 64). On the other hand, if the user inputs, for example, 81 as a country code and selects "SETUP" (step 65), the TID registration screen in step 62 is displayed-again (step 66). Then if the user selects "2. OWN NUMBER" (step 66), an own number registration screen is displayed (step 67). If the user selects "CANCEL" in the own number registration screen, the own facsimile number as the TID registration cannot be registered since the input data is invalid due to 0 digit data (step 68). On the other hand, if the user inputs 312345678 (area code+local number) as the own facsimile number and selects "SETUP" (step 69), the TID registration screen in step 62 is displayed again (step 70). If the user selects "3. ABBREVIATED NAME" (step 61) in the TID registration screen, an abbreviated name registration screen is displayed (step 71). If the use does not input any character, the name as the TID registration cannot be registered since the input data is invalid due to 0 digit data (step 72). On the other hand, if the user inputs, for example, AOYAMA as the abbreviated name and selects "SETUP" (step 73), the G4TID registration is completed.

Figure 7:
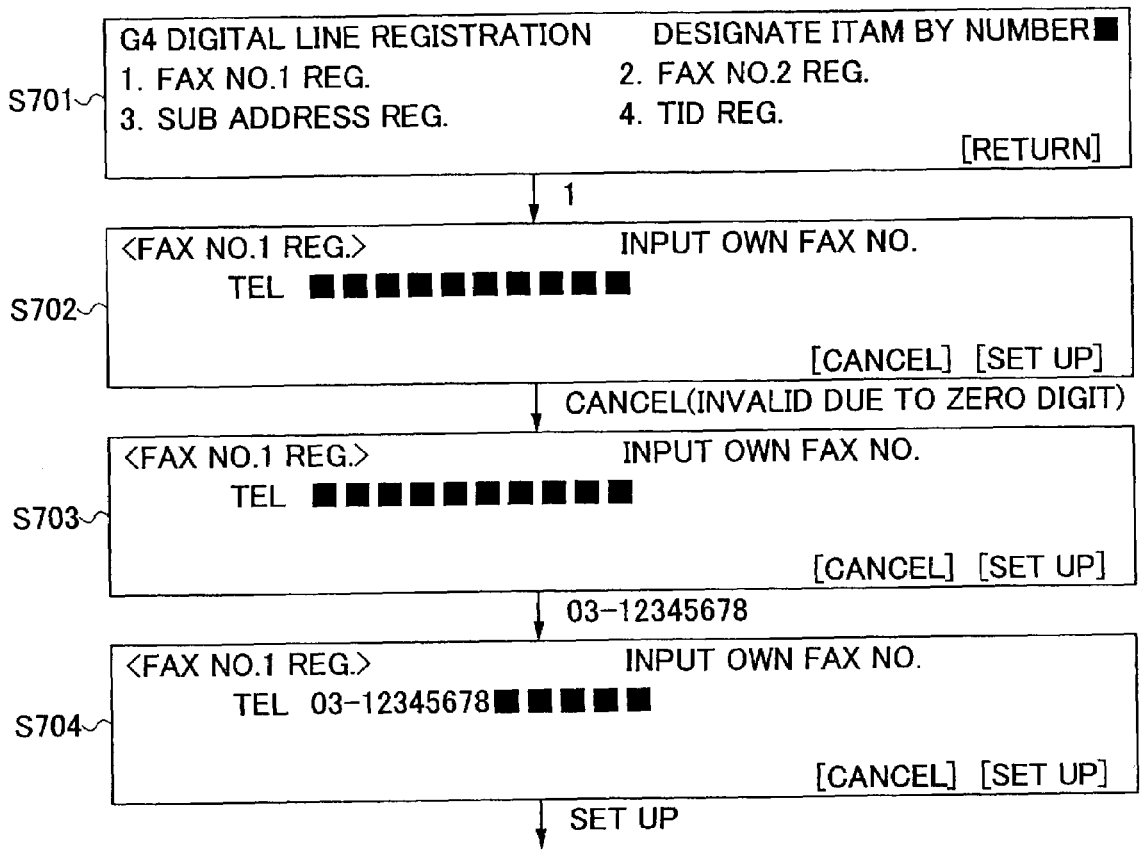
FIG. 7 is a flowchart of a subscriber number registration.

FIG. 7 is a flowchart of the subscriber number registration in which screens displayed on the operation display part 11 are sequentially indicated as steps of the registration operation. If a user selects "1. FAX NUMBER 1 REGISTRATION" (step 701) in the G4 digital line registration screen displayed by the system control part 1, a facsimile number 1 registration screen is displayed (step 702). The facsimile number 1 registration screen is for inputting the own facsimile number. If the user selects "CANCEL" here, the subscriber number cannot be registered since the input data is invalid due to 0 digit data (step 703). On the other hand, if the user inputs 03 (area code)—(pause) 12345678 (subscriber number) and selects "SETUP", the subscriber number registration is completed (step 704).

Figure 8:
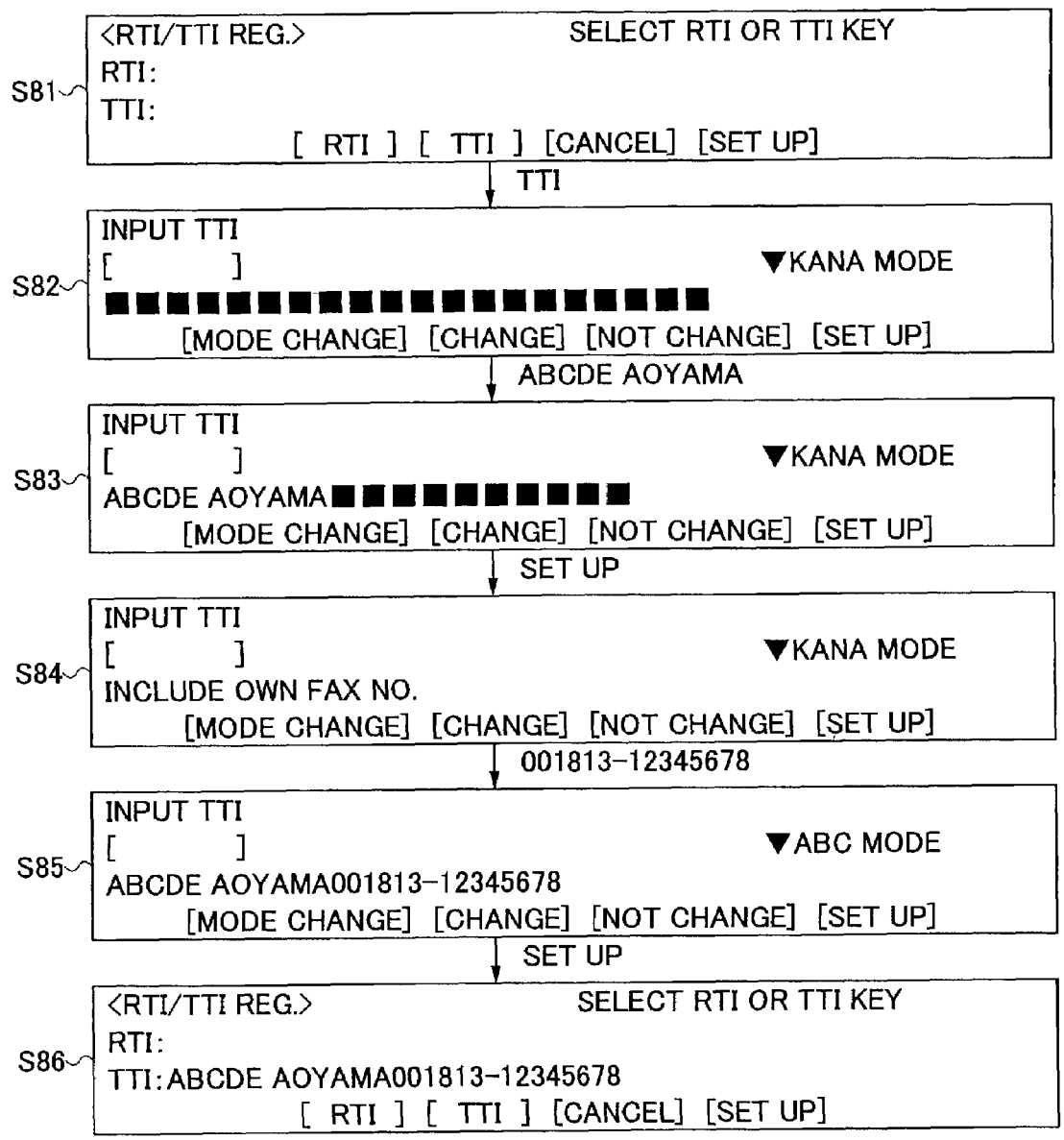
FIG. 8 is a flowchart of a TTI registration.

A description will now be given of the TTI registration. FIG. 8 is a flowchart of the TTI registration, in which screens displayed on the operation display part 11 are sequentially indicated as steps of the registration operation. It is assumed that 32 digits including the own facsimile number is set as the maximum number of digits for the TTI printing. It should be noted that the TTI printing is a function to incorporate information regarding a facsimile apparatus of a transmitting end into information to be sent to a remote facsimile apparatus of a receiving end. Additionally, it is assumed that the own facsimile number is provided in TTI in the operation of FIG. 8.

If a user selects a TTI key (TTI registration key) in a RTI/TTI registration screen displayed by the system control part 1 (step 81), the TTI which has been already registered is displayed (step 82). It should be noted that the operation of FIG. 8 is an initial registration of TTI.

If, for example, the user inputs 12 digits such as "ABCDE AOYAMA" and selects "SETUP" (step 83), there is no numeric character which can be regarded as the own facsimile number. Thus, an input screen, which indicates a message "include own facsimile number", is displayed (step 84). Here, if the user additionally inputs the own facsimile number "001813-12345678" and selects "SETUP" (step 85), the TTI can be registered with "ABCDE AOYAMA001813-12345678" incorporated therein since numbers are included in the TTI (step 86).

As mentioned above, in the present embodiment, it is determined whether or not a number character is input during the TTI registration, and registration cannot be made when no numeric character is input. Additionally, although the registration of the own number is made by user input, it is determined that the own facsimile number has already been input if any number has already been input. Thereby, it is not possible to occur a case in which the own facsimile number is not set, which results in prevention of troubles on setting approval conditions.

A description will now be given of an operation for incorporating the own facsimile number, which has been already registered in the facsimile apparatus, into TTI.

Figure 9:
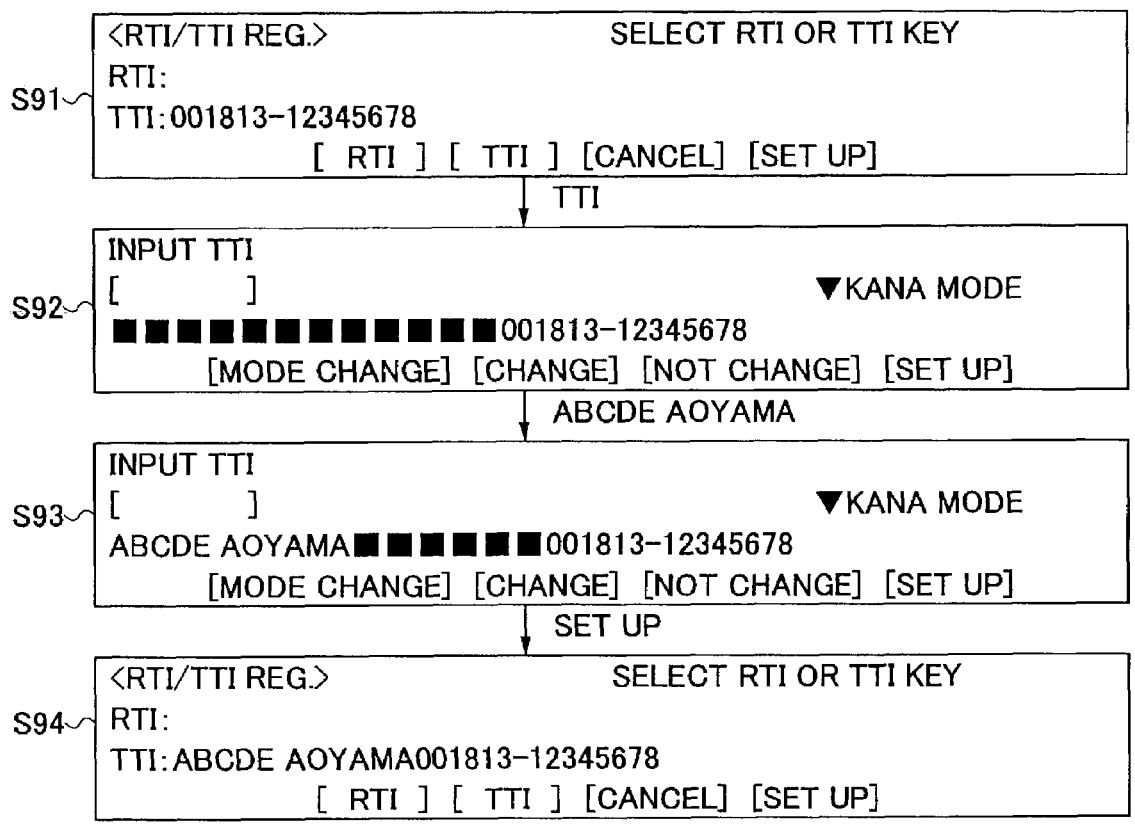
FIG. 9 is a flowchart of an operation of the TTI registration by using the own facsimile number.

FIG. 9 is a flowchart of an operation of TTI registration by using the own facsimile number, in which screens displayed on the operation display part 11 are sequentially indicated as steps of the registration operation. In the operation the own facsimile number, which has been already registered according to the operation shown in FIG. 4, is used. In the RTI/TTI registration screen displayed by the system control part 1, if a user selects the TTI key (TTI registration key) (step 91), the TTI containing the own facsimile number "001813-12345678" is displayed (step 92). It is assumed that the own facsimile number is stored separately from the TTI in the facsimile apparatus.

Although the maximum number of digits (characters) for TTI registration is 32 digits (characters), 15 digits are occupied by the own facsimile number and, thereby, the rest of 17 digits are available for TTI registration. For example, if the user inputs "ABCDE AOYAMA" consisting of 12 digits and selects "SETUP" (step 93), a total of 27 digits (12 digits+15 digits) of "ABCDE AOYAMA001813-12345678" can be registered (step 94) since there is a numeric character included in the TTI. In this embodiment, the own facsimile number is displayed at the lower end of 32 digits.

It should be noted that the TTI and the own facsimile number are stored separately in the facsimile apparatus. This is for the reason that restriction in the number of digits is also necessary for registration of the own facsimile number so as to include the own facsimile number and the TTI within 32 digits when setting the own facsimile number again after the TTI registration.

As mentioned above, in the present embodiment, the own facsimile number input through a separate operation is rendered to be an indispensable item so as to set the own facsimile number to the TTI, and a user can input the rest of the characters (digits). Accordingly, the own facsimile number is forcibly incorporated into the TTI, which results in the own facsimile number being always automatically incorporated in the TTI. Thus, there is no case in which the own facsimile number is not set, which results in prevention of troubles on setting approval conditions.

A description will now be given of an operation for incorporating the CSI, which has been already registered in the facsimile apparatus, into TTI.

Figure 10:
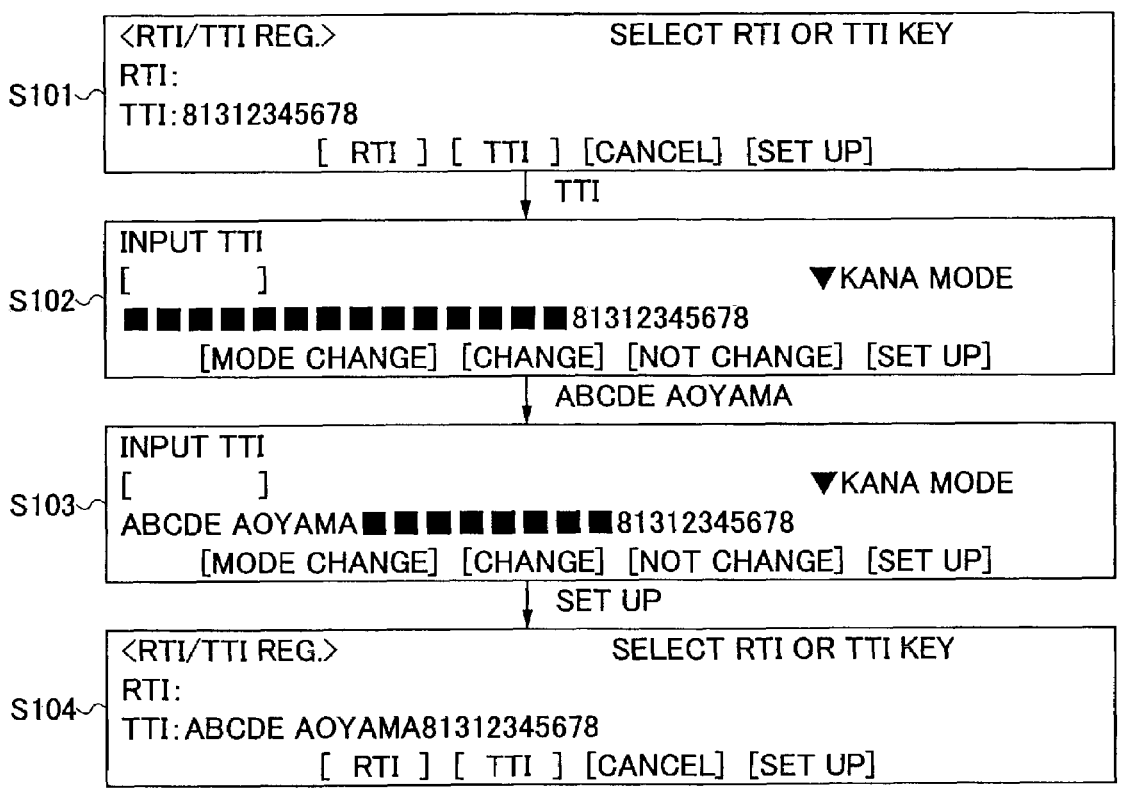
FIG. 10 is a flowchart of an operation of the TTI registration by using CSI.

FIG. 10 is a flowchart of an operation of TTI registration by using the CSI, in which screens displayed on the operation display part 11 are sequentially indicated as steps of the registration operation. In the operation the CSI, which has been already registered according to the operation shown in FIG. 5, is used. In the RTI/TTI registration screen displayed by the system control part 1, if a user selects the TTI key (TTI registration key) (step 101), the TTI containing the CSI "81312345678" is displayed (step 102). It is assumed that the CSI is stored separately from the TTI in the facsimile apparatus.

Although the maximum number of digits (characters) for TTI registration is 32 digits (characters), 11 digits are occupied by the CSI and, thereby, the reset of 21 digits (characters) are available for the TTI registration. For example, if the user inputs "ABCDE AOYAMA" consisting of 12 digits and selects "SETUP" (step 103), a total of 23 digits (12 digits+11 digits) of "ABCDE AOYAMA001813-12345678" are registered (step 104) since there is a numeric character included in the TTI. In this embodiment, the CSI is displayed at the lower end of 32 digits.

It should be noted that the TTI and the CSI are stored separately in the facsimile apparatus. This is for the reason that restriction in the number of digits is also necessary for registration of the CSI so as to include the CSI and the TTI within 32 digits when setting the CSI again after the TTI registration.

As mentioned above, in the present embodiment, the CSI input through a separate operation is rendered to be an indispensable item so as to set the own facsimile number to the TTI, and a user can input the rest of the characters (digits). Accordingly, the CSI is forcibly incorporated into the TTI, which results in the own facsimile number being always automatically incorporated in the TTI. Thus, there is no case in which the own facsimile number is not set, which results in prevention of troubles on setting approval conditions.

A description will now be given of an operation for incorporating G4TID, which has been already registered in the facsimile apparatus, into the TTI.

Figure 11:
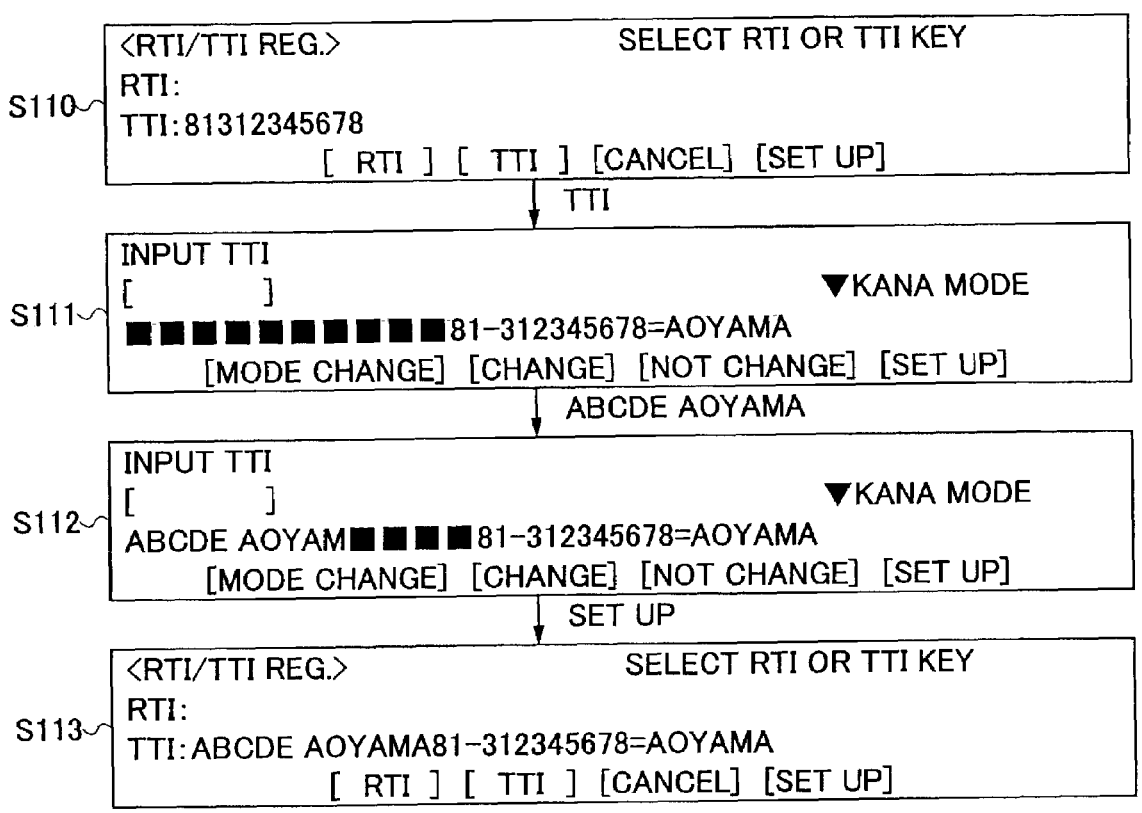
FIG. 11 is a flowchart of an operation of the TTI registration by using G4TID.

FIG. 11 is a flowchart of an operation of TTI registration by using the G4TID, in which screens displayed on the operation display part 11 are sequentially indicated as steps of the registration operation. In the operation the G4TID, which has been already registered according to the operation shown in FIG. 6, is used. In the RTI/TTI registration screen displayed by the system control part 1, if a user selects the TTI key (TTI registration key) (step 110), the TTI containing the G4TID "81312345678" is displayed (step 111). It is assumed that the G4TID is stored separately from the TTI in the facsimile apparatus.

The number of digits of the G4TID is 19 since the G4TDI contains "81312345678" and "=" which is provided between the country code and the own facsimile number, the abbreviated name and "=" which is provided in front of the abbreviated name. Although the maximum number of digits (characters) for TTI registration is 32 digits (characters), 19 digits are occupied by the CSI and, thereby, the reset of 13 digits (characters) are available for the TTI registration. For example, if the user inputs "ABCDE AOYAMA" consisting of 12 digits and selects "SETUP" (step 112), a total of 31 digits (12 digits+19 digits) of "ABCDE AOYAMA81-312345678=AOYAMA" are registered (step 113) since there is a numeric character included in the TTI. In this embodiment, the G4TID is displayed at the lower end of 32 digits.

It should be noted that the TTI and the G4TID are stored separately in the facsimile apparatus. This is for the reason that restriction in the number of digits is also necessary for registration of the G4TID so as to include the G4TID and the TTI within 32 digits when setting the G4TID again after the TTI registration.

As mentioned above, in the present embodiment, the G4YID input through a separate operation is rendered to be an indispensable item so as to set the own facsimile number to the TTI, and a user can input the rest of the characters (digits). Accordingly, the G4TID is forcibly incorporated into the TTI, which results in the own facsimile number being always automatically incorporated in the TTI. Thus, there is no case in which the own facsimile number is not set, which results in prevention of troubles on setting approval conditions.

A description will now be given of an operation for incorporating the subscriber number, which has been already registered in the facsimile apparatus, into TTI.

Figure 12:
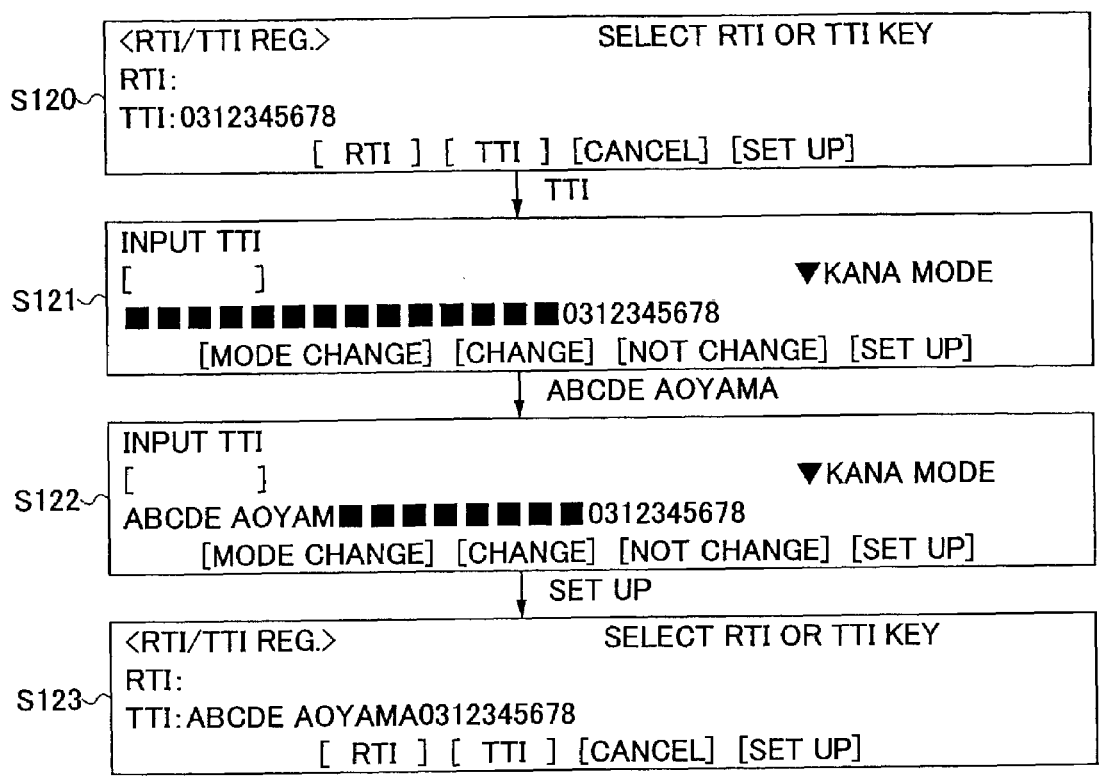
FIG. 12 is a flowchart of an operation of the TTI registration by using a subscriber number.

FIG. 12 is a flowchart of an operation of TTI registration by using the subscriber number, in which screens displayed on the operation display part 11 are sequentially indicated as steps of the registration operation. In the operation the subscriber number, which has been already registered according to the operation shown in FIG. 7, is used. In the RTI/TTI registration screen displayed by the system control part 1, if a user selects the TTI key (TTI registration key) (step 120), the TTI containing the subscriber number "0312345678" is displayed (step 121). It is assumed that the subscriber number is stored separately from the TTI in the facsimile apparatus.

Although the maximum number of digits (characters) for TTI registration is 32 digits (characters), 10 digits are occupied by the subscriber number and, thereby, the reset of 22 digits (characters) are available for the TTI registration. For example, if the user inputs "ABCDE AOYAMA" consisting of 12 digits and selects "SETUP" (step 103), a total of 22 digits (12 digits+10 digits) of "ABCDE AOYAMA0312345678" are registered (step 104) since there is a numeric character included in the TTI. In this embodiment, the subscriber number is displayed at the lower end of 32 digits.

It should be noted that the TTI and the subscriber number are stored separately in the facsimile apparatus. This is for the reason that restriction in the number of digits is also necessary for registration of the subscriber number so as to include the subscriber number and the TTI within 32 digits when setting the subscriber number again after the TTI registration.

As mentioned above, in the present embodiment, the subscriber number input through a separate operation is rendered to be an indispensable item so as to set the own facsimile number to the TTI, and a user can input the rest of the characters (digits). Accordingly, the subscriber number is forcibly incorporated into the TTI, which results in the own facsimile number being always automatically incorporated in the TTI. Thus, there is no case in which the own facsimile number is not set, which results in prevention of troubles on setting approval conditions.

The present invention is not limited to the specifically disclosed embodiments, and variations and modifications may be made without departing from the present invention.

The present application is based on Japanese priority applications No. 2001-242209 filed Aug. 9, 2001 and No. 2002-223778 file Jul. 31, 2002, the entire contents of which are hereby incorporated by reference.

What is claimed is:

1. A facsimile apparatus comprising:
   an operation display part through which information containing an own facsimile number is input;
   a memory for storing information containing the input own facsimile number;
   a network control unit which transmits image data to and receives image data from a remote facsimile apparatus through a communication line; and
   a system control part which automatically incorporating the input own facsimile number into transmitter terminal identification (TTD information as information regarding a transmitting end,
   wherein the system control part adds the information regarding a transmitting end to the image data when the network control unit transmits the image data to said remote facsimile apparatus,
   wherein the system control part comprises:
      an input request part which requests an input of information containing the own facsimile number to be added to the image data;
      a determination part which determines whether to register the information stored in the memory by combining with the TTI information; and
      a TTI registration part which registers as TTI the information obtained by combining the information containing the own facsimile number with the TTI information, and
   wherein said TTI registration part registers the TTI by combining the information containing the own facsimile number with the TTI information only when the information stored in said memory is determined to contain a numerical character.

2. The facsimile apparatus as claimed in claim 1, wherein the information containing the own facsimile number is one of own facsimile number information consisting of the own facsimile number, called subscriber identification (CSI) information, G4 terminal identification (G4TID) information and subscriber number information.

3. The facsimile apparatus as claimed in claim 2, wherein said TTI registration part incorporates the own facsimile number information stored in said memory into the TTI.

4. The facsimile apparatus as claimed in claim 2, wherein said TTI registration part incorporates the CSI information stored in said memory into the TTI.

5. The facsimile apparatus as claimed in claim 2, wherein said TTI registration part incorporates the G4TID information stored in said memory into the TTI.

6. The facsimile apparatus as claimed in claim 2, wherein said TTI registration part incorporates the subscriber number information stored in said memory into the TTI.

7. A facsimile apparatus comprising:
   input means for inputting information containing an own facsimile number;
   memory means for storing information containing the input own facsimile number; means for automatically incorporating the input own facsimile number into transmitter terminal identification (TTI) information as information regarding a transmitting end;
   data transmission and reception means for transmitting image data to and receiving image data from a remote facsimile apparatus through a communication line;
   information adding means for adding the information regarding a transmitting end to the image data when the data transmission and reception means transmits the image data to said remote facsimile apparatus;
   input request means for requesting an input of information containing the own facsimile number to be added to the image data by said information adding means;
   determination means for determining whether to register the information stored in the memory means by combining with the TTI information; and
   TTI registration means for registering as TTI the information obtained by combining the information containing the own facsimile number with the TTI information,
   wherein said TTI registration means registers the TTI by combining the information containing the own facsimile number with the TTI information only when the information stored in said memory means is determined to contain a numerical character.

8. The facsimile apparatus as claimed in claim 7, wherein the information containing the own facsimile number is one of own facsimile number information consisting of the own facsimile number, called subscriber identification (CSI) information, G4 terminal identification (G4TID) information and subscriber number information.

9. The facsimile apparatus as claimed in claim 8, wherein said TTI registration means incorporates the own facsimile number information stored in said memory means into the TTI.

10. The facsimile apparatus as claimed in claim 8, wherein said TTI registration means incorporates the CSI information stored in said memory means into the TTI.

11. The facsimile apparatus as claimed in claim 8, wherein said TTI registration means incorporates the G4TID information stored in said memory means into the TTI.

12. The facsimile apparatus as claimed in claim 8, wherein said TTI registration means incorporates the subscriber number inflation stored in said memory means into the TTI.

* * * * *